(12) United States Patent
Morper et al.

(10) Patent No.: US 11,340,943 B2
(45) Date of Patent: May 24, 2022

(54) STEERING OF VIRTUALIZED RESOURCES

(71) Applicant: NOKIA SOLUTIONS AND NETWORKS GMBH & CO. KG, Munich (DE)

(72) Inventors: Hans-Jochen Morper, Erdweg (DE); Michael Jarschel, Munich (DE)

(73) Assignee: NOKIA SOLUTIONS AND NETWORKS GMBH & CO. KG, Munich (DE)

( * ) Notice: Subject to any disclaimer, the term of this patent is extended or adjusted under 35 U.S.C. 154(b) by 489 days.

(21) Appl. No.: 15/533,081

(22) PCT Filed: Dec. 4, 2014

(86) PCT No.: PCT/EP2014/076500
§ 371 (c)(1),
(2) Date: Jun. 5, 2017

(87) PCT Pub. No.: WO2016/086991
PCT Pub. Date: Jun. 9, 2016

(65) Prior Publication Data
US 2017/0329639 A1 Nov. 16, 2017

(51) Int. Cl.
*G06F 9/50* (2006.01)
*G06F 9/455* (2018.01)
*G06F 11/34* (2006.01)

(52) U.S. Cl.
CPC ........ *G06F 9/5005* (2013.01); *G06F 9/45558* (2013.01); *G06F 9/5038* (2013.01); *G06F 9/5072* (2013.01); *G06F 9/505* (2013.01); *G06F 11/3495* (2013.01); *G06F 2009/4557* (2013.01)

(58) Field of Classification Search
CPC ... G06F 9/5005; G06F 9/45558; G06F 9/5038
See application file for complete search history.

(56) References Cited

U.S. PATENT DOCUMENTS 9,258,237 B1 * 2/2016 Smith .................. H04L 47/122
2007/0240161 A1 10/2007 Prabhakar et al.
(Continued)

FOREIGN PATENT DOCUMENTS

CN 103155666 A 6/2013
CN 103649940 A 3/2014
(Continued)

OTHER PUBLICATIONS

International Search Report & Written Opinion dated Mar. 31, 2015 corresponding to International Patent Application No. PCT/EP2014/076500.
(Continued)

*Primary Examiner* — Nicholas R Taylor
*Assistant Examiner* — Sanjoy K Roy
(74) *Attorney, Agent, or Firm* — Squire Patton Boggs (US) LLP

(57) ABSTRACT

The invention addresses method, apparatus, system and computer program product for controlling virtualized resources, comprising receiving a request to implement a network service at a network element, looking up key parameters of the network service, selecting at least one compute resource according to the network service, deploying at least one application as required to fulfill the network service, selecting at least one transport resource to interconnect the network element with the at least one application, instructing an access control conductor that a transport access manager has exclusive access to at least part of the network element's resources, and instructing the transport access manager to establish a transport path at the network element.

15 Claims, 14 Drawing Sheets

(56) References Cited

U.S. PATENT DOCUMENTS

| | | | |
|---|---|---|---|
| 2014/0074905 A1 | 3/2014 | Schincariol et al. | |
| 2014/0200036 A1 | 7/2014 | Egner et al. | |
| 2014/0317293 A1* | 10/2014 | Shatzkamer | G06F 9/455 709/226 |
| 2014/0317305 A1 | 10/2014 | Branson et al. | |
| 2014/0344439 A1 | 11/2014 | Kempf et al. | |
| 2015/0295849 A1* | 10/2015 | Xia | H04L 47/782 370/235 |
| 2015/0370586 A1 | 12/2015 | Cooper et al. | |
| 2016/0085576 A1* | 3/2016 | Chastain | G06F 9/45533 718/1 |

FOREIGN PATENT DOCUMENTS

| | | |
|---|---|---|
| CN | 104137452 A | 11/2014 |
| JP | H10254805 A | 9/1998 |
| JP | 2008/152342 A | 7/2008 |
| KR | 20110030447 A | 3/2011 |
| WO | 2014/157512 A1 | 10/2014 |

OTHER PUBLICATIONS

Mar. 19, 2018 Office Action issued in Korean Patent Application No. 10-2017-018230.

Notice to File a Response dated Aug. 30, 2018 corresponding to Korean Patent Application No. 10-2017-7018230, and English translation thereof.

Official Action dated Aug. 6, 2018 corresponding to Japanese Patent Application No. 2017-530008.

Koji Tsubouchi et al., "NFV Management and Orchestration Technology to Automatically Build Network Services on Demand," vol. 114, No. 206, IEICE Technical Report, The Institute of Electronics, Information and Communication Engineers, Sep. 4, 2014, pp. 107-112.

Chinese Office Action issued in corresponding Chinese Patent Application No. 201480084610.2 dated Jul. 14, 2020.

Chinese Office Action issued in corresponding Chinese Patent Application No. 201480084610.2 dated Nov. 30, 2020.

Chinese Office Action corresponding to CN Appln. No. 201480084610.2, dated Jan. 17, 2020.

Yohei KAMINAGA et al., "A Study on SDN Application to the Career IP Network", The Institute of Electronics, Information and Communication Engineer, IEICE Technical Report IN2014-41 (Jul. 2014), 4 pages.

Takuya Shimojo et al., " A Study on Management of Distributed Virtualized Resources", Proceedings of the 2014 IEICE Communications Society Conference, Sep. 9, 2014, the Institute of Electornics, Information and Communication Engineers 2014 Communication Society Convention lecture collected papers 1, 4 pages.

* cited by examiner

PRIOR ART

STEERING OF VIRTUALIZED RESOURCES

FIELD OF THE INVENTION

The present invention generally relates to steering of virtualized resources which are applicable e.g. in wired and wireless communication networks, and more specifically relates to a method, apparatus, system and computer program product for providing an improved management solution for the configuration of virtual software defined networking-enabled transport network elements and the assignment of software defined networking controllers to them for the purpose of interconnecting cloud applications and providing network functions in conjunction with a cloud management system.

BACKGROUND

With the rise of the web and its multitude of services that are the standard today, it became essential for the operators of the underlying infrastructure to manage their resources efficiently in order to gain a competitive edge or just keep up with the market. A widely adopted method to achieve this is virtualization, i.e., the consolidation of different applications and services onto shared physical hardware. In a conventional information technology IT environment these physical resources are usually sub-divided into compute and network hardware. Traditionally, these are managed by two separate personnel groups—server and network administrators. Consequently, the compute- and network virtualization approaches have been developed mostly independent from each other.

With the increasing popularity of cloud computing and its dynamic resource allocation, it became apparent that the network connecting these virtual resources with each other and their users was not flexible enough to keep up with this high degree of automation. As networks were mostly managed and developed independently from the compute infrastructure, their level of automation was in a far less advanced state. Significant human interaction was still necessary to provide virtual networks for cloud computing customers, considerably slowing the deployment process. As a general cause for this problem, the slow pace of innovation in networking caused by the tight integration of hard- and software in proprietary devices was identified. To remedy this issue, the concept of software defined networking SDN was adopted. The key SDN principles are separation of control- and data plane, logically-centralized control, open interfaces, and programmability of the network.

Generally, the separation of control- and data plane is seen as the most important SDN principle as it enables the development of control plane and data plane independently from each other, which leads to shorter innovation cycles as the software control plane can now evolve much faster and is not limited by the slow hardware development cycles. The basic three-tier SDN architecture is shown in FIG. 1a.

The data plane consists of programmable switches that perform the actual forwarding of packet data. These can be hardware switches, e.g., HP ProCurve 2920, Pica8 Pronto 3290, or software switches like the Open vSwitch. The control instructions are transmitted to the switches from the control plane via the "Southbound-API". The most popular realization of this interface is currently the OpenFlow protocol. Another example would be IETF ForCES. The controller plane, not unlike a conventional operating system, provides basic low-level functionality such as interface abstraction and topology detection/tracking to the control applications, which communicate with the controller plane via the "Northbound-API". Implementations of the controller plane are for example the OpenDayLight and Ryu controllers. The northbound interface is most commonly implemented using the REST principle.

While the basic architecture is three-tiered, the relationship of the realization is not limited to just three instances. Multiple network elements can be controlled by a single controller, which in turn can be distributed across multiple equal nodes, hierarchical according to area of responsibility, or stacked according to functionality. Additionally, multiple layers of indirection can be introduced to facilitate flow space virtualization and multi-tenancy. This flexibility in implementation allows the user to build the network according to his requirements instead of having to rely on proprietary solutions that may not entirely fit into the specific deployment scenario.

After the pervasive introduction of cloud computing in almost all areas of IT, it was a logical step to also apply the principle to network functions NFs like wide area network WAN optimisers, deep packet inspectors, quality of service QoS/quality of experience QoE monitors etc. These network functions are conventionally deployed as middle boxes in the network, which does have the disadvantage that they are not scalable, cannot be deployed on demand, and are very expensive. Realizing these network functions as software on virtual machines inside a cloud presents multiple challenges in terms of performance and management. Therefore, a working group of the European Telecommunications Standards Institute ETSI was founded to find a standardized way to deploy such functions. Recently, OpenNFV has emerged as a project to provide an open-source implementation of the network functions virtualization approach. Many vendors, e.g., Embrane, already have virtualized network functions in their portfolio.

Network Functions Virtualization NFV is an industry initiative to specify guidelines for telecom network operators and vendors for transforming today's network architecture—which includes specific hardware for specific functions—to a network architecture where network functions include software applications that may run on data center platforms (servers, switches and storage) and can inter-work with traditional network nodes and end user devices. It envisions the implementation of network functions in software that can run on a range of industry standard server hardware and that can be instantiated (and possibly relocated during operation) in a highly-automated manner in various locations in the network as required, without the need for installation of new hardware equipment. NFV builds on the recent advances of the IT industry in the fields of virtualization and cloud computing and tries to accommodate these technologies in the telecom industry by addressing the special requirements and complex use cases of the telecom domain.

ETSI has established an Industry Specification Group ISG in order to prepare a recommendation on how the ecosystem of virtualized network functions VNFs should work. Primary purpose of NFV is to let VNFs be deployed in a hybrid environment, where both legacy and virtual network functions NFs coexist. NFV's responsibility is limited to provide an ecosystem in which the virtualised network functions can be deployed in a common, vendor-independent way. The ecosystem is decomposed into blocks with different responsibilities and functionalities. The blocks are shown in FIG. 2.

A Virtual Network Function VNF is the virtualized version of a classical NF. The VNF Manager VNFM is responsible for the lifecycle management (instantiation, update, scaling, termination, etc.) of VNFs. More than one VNFM can operate in the ecosystem, each managing one or more VNFs. The virtualized infrastructure manager VIM is responsible for the management of infrastructure (e.g. the data center resources). It maintains an inventory and manages allocation and release of virtual resources. Multiple and specific (e.g. network, storage, wide-area transport resources) VIMs may operate in the ecosystem. Network functions virtualization orchestrator NFVO (denoted as network orchestrator further on) is the central component of the system, having an overall view of available and allocated resources and their capabilities. The NFVO is responsible for controlling resource usage and applying policies.

The ETSI NFV architecture describes a system for deployment of network services as virtual network functions in the cloud. However, modern clouds are often distributed across data centres in multiple locations. Therefore, a transport-interconnect between those data centres is necessary. Additionally, SDN-based network services may be deployed with the control plane hosted in the cloud which controls data plane components outside the cloud. This results in several tasks that need to be performed:

- Configuration of the transport resources to provide connectivity between cloud-based network functions in conjunction with the cloud management system (e.g. a virtualized home subscriber server HSS application in a first data centre connected to a packet data gateway P-Gw application resided in a second data centre)
- Configuration and enforcement of network service requirements in the transport plane for virtual transport resources
- Configuration of applications running in a cloud with network functions that reside outside a cloud (e.g. connecting a virtualized mobile management entity MME with a physical eNodeB)
- Steering of transport resources out of applications that run in data centres (e.g. a Gateway Gw-Control App that controls physical resources of an aggregation switch to manage GPRS tunnel protocol GTP tunnel handling via SDN)

In case there are several virtualized entities in a network that have control access to the same pool of physical transport resources (e.g. transport SDN controller, application[s]), there will be a competition on network transport resource utilization. In case of those entities are unaware of each other (default case), there will be the need for a control instance that steers the control access to said resources.

There are two conventional ways to provide intra-cloud connectivity and deploy SDN data paths. The first way is the more or less "manual" configuration of the network elements via their management interfaces or a management system by a network administrator. This approach is not automated and therefore slow and inflexible. It takes time for a human administrator to become available, determine the service requirements and then configure the devices. This is not fast enough for today's "instant" cloud applications or network functions. Furthermore, manual configuration always bears the risk of human error, which may lead to a multitude of service disruptions.

The alternative is to bypass the necessity for transport network elements outside the cloud by deploying the entire network service inside a single data centre. This allows the use of the cloud management system for the automated deployment of all service components and the required connectivity. The disadvantage of this approach is that the entire network service is centralized in one site, which may result in latency and/or resiliency issues. Furthermore, it is not possible to configure transport network elements outside the data centre to enable SDN-based network functions in the network.

SUMMARY OF THE INVENTION

In order to overcome the drawbacks of the prior art, the present invention usefully provides improved control of virtualized resources.

In particular, the present invention usefully provides a method, apparatus, system and computer program product for providing an improved management solution for the configuration of virtual SDN-enabled transport network elements and the assignment of SDN controllers to them for the purpose of interconnecting cloud applications and providing network functions in conjunction with a cloud management system.

According to a first aspect of the present invention, there is provided a processor implemented method for controlling virtualized resources, including receiving a request to implement a network service at a network element, looking up key parameters of the network service, selecting at least one compute resource according to the network service, deploying at least one application as required to fulfill the network service, selecting at least one transport resource to interconnect the network element with the at least one application, instructing an access control conductor that a transport access manager has exclusive access to at least part of the network element's resources, and instructing the transport access manager to establish a transport path at the network element.

According to a second aspect of the present invention, there is provided an apparatus for controlling virtualized resources, including at least one processor, and at least one memory for storing instructions to be executed by the processor, wherein the at least one memory and the instructions are configured to, with the at least one processor, cause the apparatus at least to perform receiving a request to implement a network service at a network element, looking up parameters of the network service, selecting at least one compute resource according to the network service, deploying at least one application as required to fulfill the network service, selecting at least one transport resource to interconnect the network element with the at least one application, instructing an access control conductor that a transport access manager has exclusive access to at least part of the network element's resources, and instructing the transport access manager to establish a transport path at the network element.

According to a third aspect of the present invention, there is provided a system for controlling virtualized resources, including a data center including compute resources, a database storing parameters of a network service, a cloud management system configured to select at least one compute resource according to the network service, an application management system configured to deploy at least one application, as required to fulfill the network service, an access control conductor configured to control access to a network element affected by the network service, a transport access manager configured to select at least one transport resource to interconnect the network element with the at least one application, and establish a transport path at the network element, and an orchestrator configured to control, based on a request to implement the network service, the cloud management system, the application management system, the access control conductor and the transport access manager.

According to a fourth aspect of the present invention, there is provided computer program product for a computer, including software code portions for at least performing the steps according to the first aspect the when the product is run on the computer.

Advantageous further developments or modifications of the aforementioned example aspects of the present invention are set out in the dependent claims.

According to certain example embodiments of the invention, the network functions virtualization orchestrator is a network orchestration part of a software defined networking system.

Further, according to certain example embodiments of the invention, the access control conductor is configured to manage the competitive access of applications or controllers to transport resources of the same network elements.

Further, according to certain example embodiments of the invention, the compute resources are virtual machines.

Further, according to certain example embodiments of the invention, the transport access manager includes a software defined networking transport controller.

Further, according to certain example embodiments of the invention the transport access manager further including an access control conductor configured to manage accessibility of control access to respective network elements.

Still further, according to certain example embodiments, the request is received from a high level entity, such as operations support system and a business support system.

BRIEF DESCRIPTION OF DRAWINGS

For a more complete understanding of example embodiments of the invention, reference is now made to the following descriptions taken in connection with the accompanying drawings in which.

DESCRIPTION OF EXAMPLE EMBODIMENTS

Figure 1A:
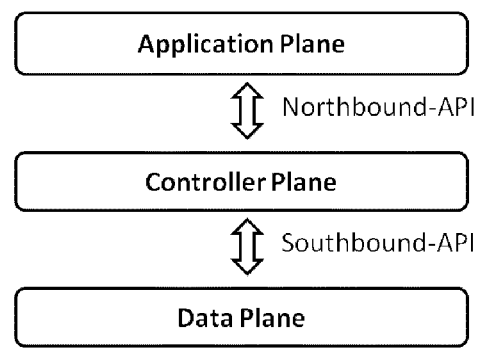
FIG. 1a schematically illustrates a basic architecture of a software defined networking system.

Example aspects of the invention will be described herein below. More specifically, example aspects of the invention are described hereinafter with reference to particular non-limiting examples and to what are presently considered to be conceivable example embodiments of the invention. A person skilled in the art will appreciate that the invention is by no means limited to these examples, and may be more broadly applied.

It is to be noted that the following description of the invention and its example embodiments mainly refers to specifications being used as non-limiting examples for certain example network configurations and deployments. Namely, the invention and its example embodiments are mainly described e.g. in relation to network virtualization e.g. for 3GPP specifications being used as non-limiting examples for certain example network configurations and deployments. As such, the description of example embodiments given herein specifically refers to terminology which is directly related thereto. Such terminology is only used in the context of the presented non-limiting examples, and does naturally not limit the invention in any way. Rather, any other virtualization and network configuration or system deployment, etc. may also be utilized as long as compliant with the features described herein.

Hereinafter, various example embodiments and implementations of the invention and its aspects or example embodiments are described using several alternatives. It is generally noted that, according to certain needs and constraints, all of the described alternatives may be provided alone or in any conceivable combination (also including combinations of individual features of the various alternatives).

In particular, the following examples, versions and embodiments are to be understood only as illustrative examples. Although the specification may refer to "an", "one", or "some" example version(s) or example embodiment(s) in several locations, this does not necessarily mean that each such reference is to the same example version(s) or example embodiment(s), or that the feature only applies to a single example version or example embodiment. Single features of different example embodiments may also be combined to provide other example embodiments. Furthermore, words "comprising" and "including" should be understood as not limiting the described example embodiments to consist of only those features that have been mentioned and such example versions and example embodiments may also contain also features, structures, units, modules etc. that have not been specifically mentioned.

As already indicated above, the invention provides improved management solution for the configuration of virtual SDN-enabled transport network elements and the assignment of SDN controllers to them for the purpose of interconnecting cloud applications and providing network functions in conjunction with a cloud management system Generally, (network) operators can choose from a variety of compute virtualization techniques and concepts to manage their workloads according to their specific use case and circumstances. The key differences between the approaches are in the level of isolation between the virtual resources and the access to the underlying physical hardware.

Figure 1B:
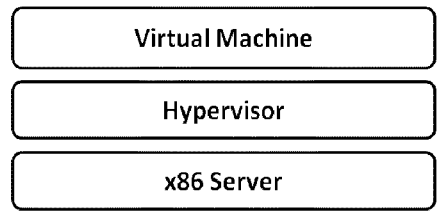
FIG. 1b schematically shows example virtual compute resources.
Figure 2:
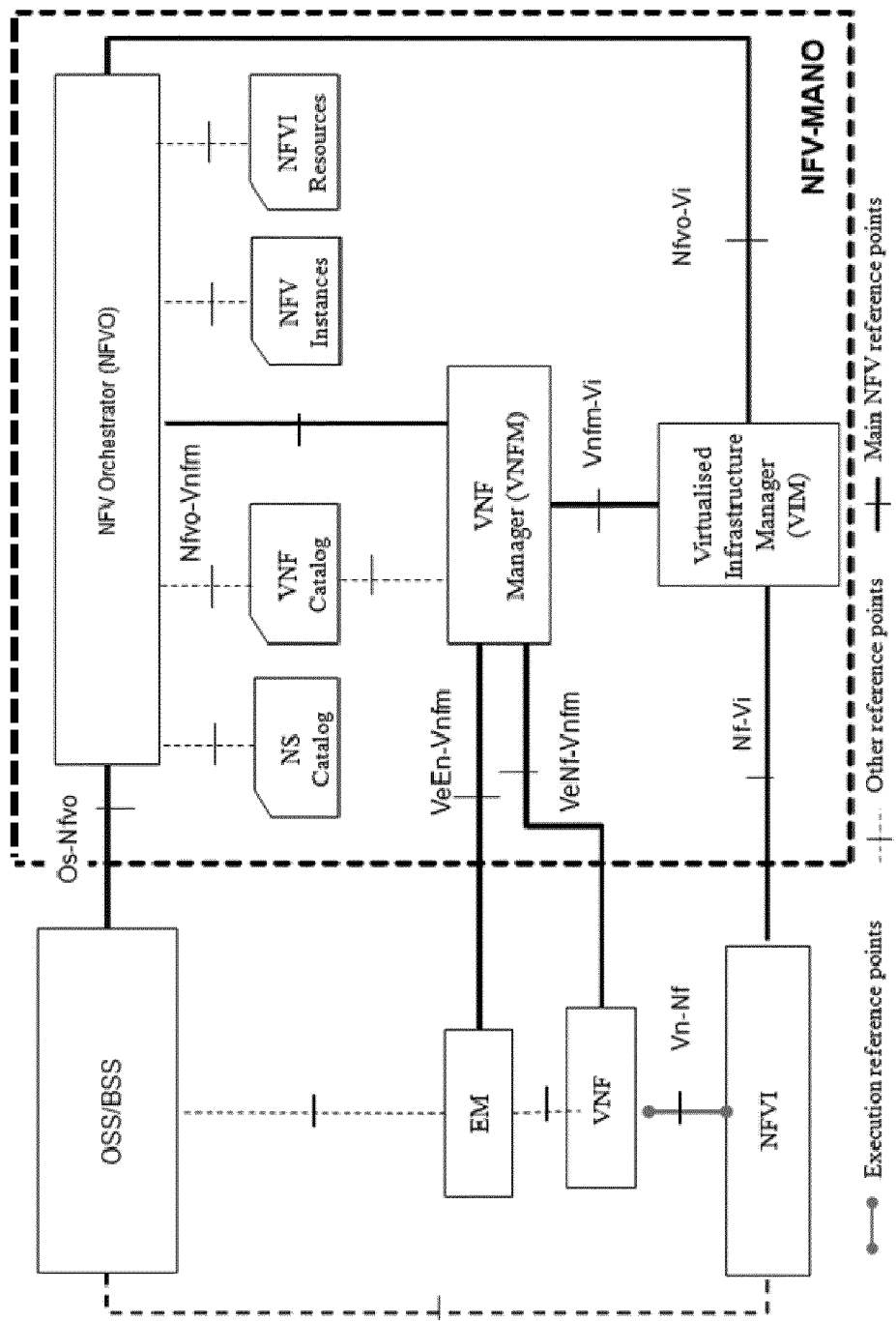
FIG. 2 schematically illustrates an ecosystem of virtualized network functions according to specification by the European Telecommunications Standards Institute (ETSI)

In the case of full virtualization, as illustrated in FIG. 1b, the operating system is oblivious to the fact that it is run in a virtual environment, i.e., it is unmodified to the operation on physical hardware. This is the most common form of virtualization, supported by most hypervisors such as VMware ESXi, KVM, or Microsoft Hyper-V. In conjunction with virtualization-ready hardware, e.g., Intel VT-x, this approach offers the best performance isolation. However, it also causes a significant virtualization overhead. A variant with reduced overhead is paravirtualization. Here the guest operating system has to be modified to support special API calls to the hypervisor, i.e., it has to be made aware of the virtualization. Xen is best known for this mode of operation, but it can also be found in other hypervisors. The approach with the least amount of overhead is container virtualization. Here, not the entire operating system is virtualised, but rather the applications are run in isolated environments (containers) on top of the same operating system. The most popular representative of this variant are the Linux kernel containers, which have gained a significant boost in adoption through the deployment tools provided by Docker.

Instead of the separation of compute workloads, network virtualization deals with the separation of networks on the same physical substrate from a performance as well as a security point of view. Today this is mostly achieved through tagging concepts like virtual local area network VLAN or multiprotocol label switching MPLS as well as tunnelling approaches like virtual extensible LAN VXLAN or Network Virtualization using Generic Routing Encapsulation NVGRE. While network virtualization deals with how the data on the intermediate links is interpreted or scheduled, the enforcement of these strategies takes place in the network nodes. Using compute virtualization techniques, the network nodes themselves can also be virtualized. In data centers, however, virtual network nodes are commonly directly integrated with the hypervisor on top of a physical host. These virtual switches, e.g., Cisco Nexus 1000V, often serve as entry point into virtual overlay networks by encapsulating packets or assigning tags to them. The virtualization of networks can be supported by hardware pre-processing, e.g., assigning packets from different virtual networks to individual processing pipelines or queues.

While virtualization is a powerful tool to consolidate workloads, a significant cost reduction can only be achieved, if the physical resources as well as the distribution of workloads on them can be managed efficiently and ideally in an automated fashion. This goal has been achieved through the introduction of overarching systems for joint management of the hardware resources in data centres and beyond. Today, these management systems together with their physical resources are commonly summarized under the term "cloud".

A cloud system usually includes the following basic components, namely a management system, compute nodes, and storage systems.

Compute nodes are computing devices used to process the workload, e.g., they can be x86 servers running a hypervisor, which hosts the workloads in the form of virtual machines. The storage systems provide different types of disk space to house the virtual drives of the virtual machines as well as templates for the creation of new VMs. The management system controls the cloud by creating new virtual machines on compute nodes according to application requirements using the available templates and storage space. Furthermore, it can move workloads between the physical hosts to increase resource utilization and reduce energy consumption. Examples for such a management system are commercial solutions like VMware vCloud and Microsoft System Center, or open-source projects like OpenStack and OpenNebula.

For a swift automated deployment of applications by a cloud management system alone, a large number of virtual machine templates would be necessary to cover even the most basic combinations of operating systems and application software. Therefore, it has become the standard that the cloud management systems only instantiate virtual machines with standard operating system images. The applications are then automatically installed into these virtual machines using configuration systems. Cloud management and configuration systems ideally integrate with each other, e.g., OpenStack Heat and Chef or Puppet.

Therefore, the invention includes a Transport Application Manager TAM that facilitates the execution of these tasks in line withthe ETSI NFV framework.

In particular, the invention provides mechanisms that allow applications to steer/control transport resources out of an available pool. These mechanisms are also applicable to environments where all virtualized resources (compute, transport, radio, . . . ) are managed by one or a multitude of orchestration entities (such as addressed by ETSI NFV). Furthermore, it provides additional functions that allow the management of the control access to said resources between transport network orchestration and applications.

The term "orchestrator", which is used throughout the document, is addressing the network orchestration part of the described system and therefore is used synonymously-with "network orchestrator".

Figure 3:
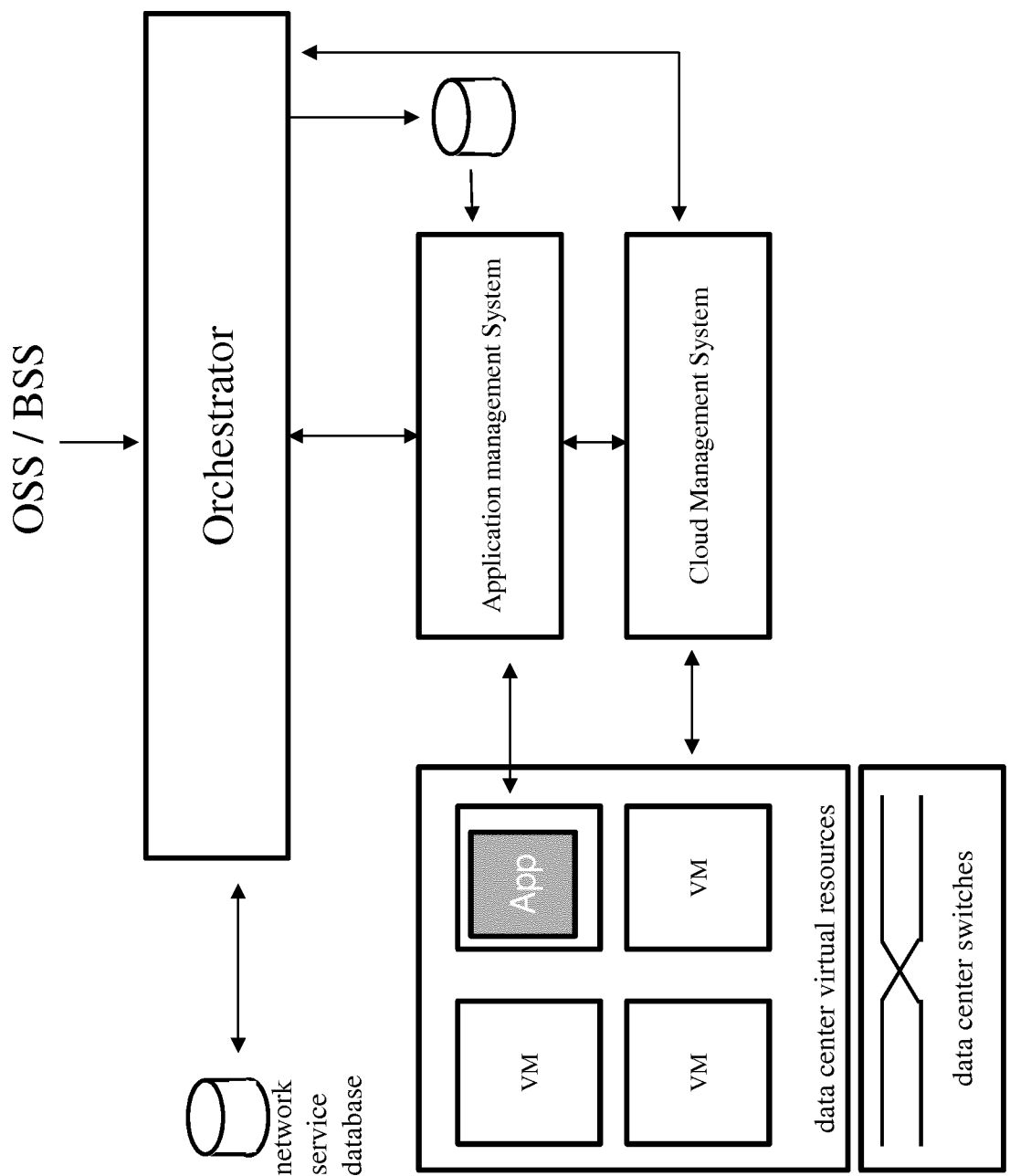
FIG. 3 schematically illustrates a system at which example embodiments of an ETSI NFV compliant system are applied.

FIG. 3 illustrates a system which shall be extended by means of this invention. In this setup virtualized compute resources (represented by a data center and virtual machines on the left of FIG. 3) are controlled by a multitude of steering elements to configure network services of a telecommunication system, e.g., for a mobile network. In such a system, network services include an arrangement of applications that are interconnected to enable a specific service (most commonly denoted as service graph). Such a service graph could, for example, include a number of radio base stations that shall be connected to mobility management entities and gateways. The implementation of such a service graph would require processing resources and applications that utilize them (for example mobility management entity MME) and the corresponding interconnect of topological points (radio base stations) to said applications (those may run, for example, in a data center).

These service graphs are stored in data bases (cf. network service data base in FIG. 3), which are accessible by a main network service management system denoted as orchestrator in the present specification.

Typically, the implementation of such a network service (or service graph, respectively) is invoked due to demands out of an operations support system OSS or business support system BSS. For example, if new base stations are rolled out and need to be attached to a virtualized network, or if a new service shall be rolled out, the orchestrator may be instructed by a high level command to implement a network service with given topological and/or QoS constraints (e.g., network service no. 123 for 50 thousand users, interconnect topological area A with applications at 10 GBit/s).

In one implementation, the orchestrator may look up the according service graph in its network service data base and take according actions allowing higher layer management systems like OSS/BSS to use simple abstract commands without the necessity for those systems to have knowledge about resources, applications and so forth.

Figure 4:
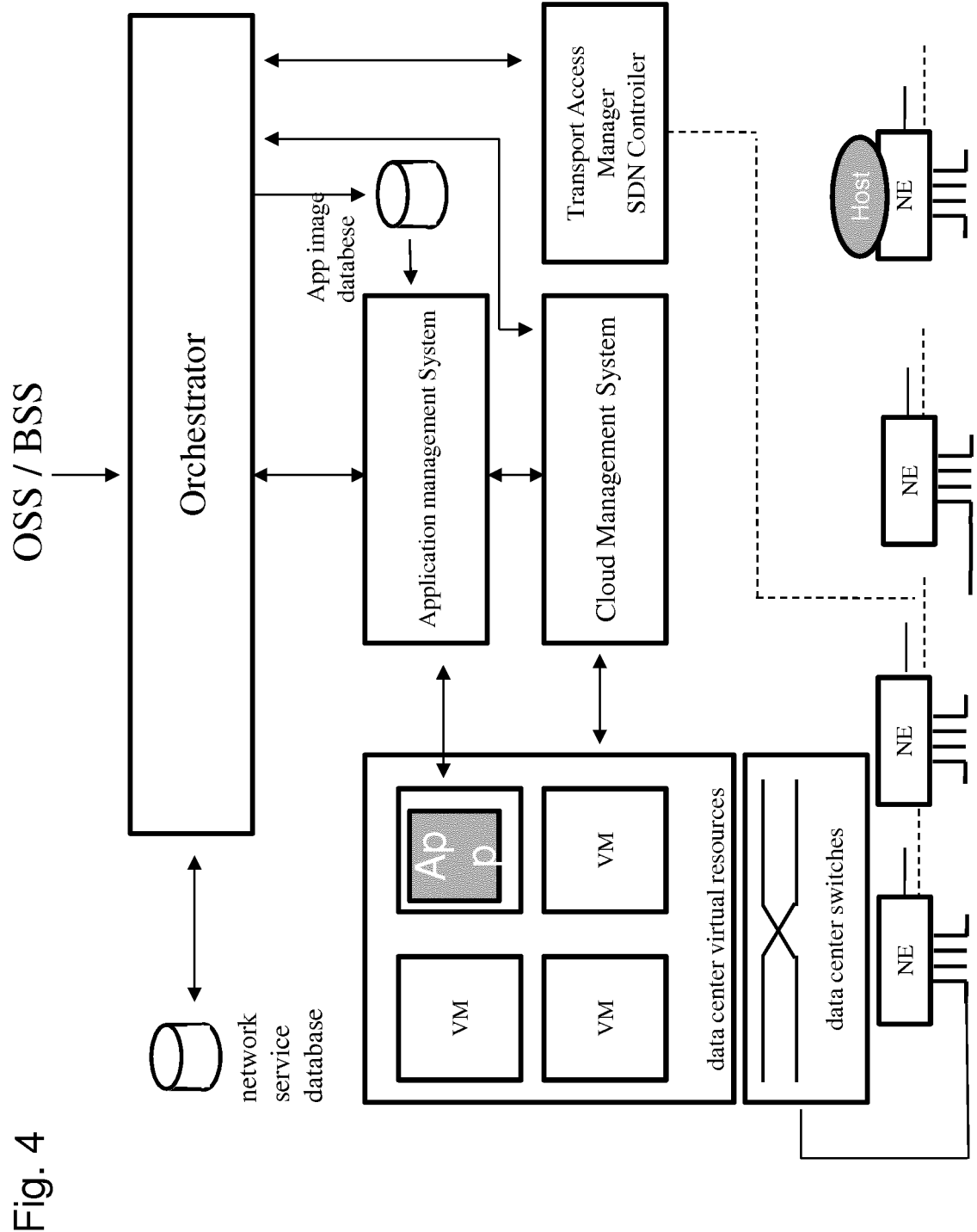
FIG. 4 illustrates a setup for controlling virtualized resources according to certain example embodiments of an ETSI NFV compliant system including transport resources.

Generally, the orchestrator supported by a set of management functions that typically include a cloud management system, an application management system and, according to some example embodiments of the invention, additional entities like, e.g., an SDN controller (shown in FIG. 4).

A cloud management system enables the instantiation of virtual compute resources like virtual machines and the interconnect between applications that may run on top of them. Usually, data centers are built using commercial-off-the shelf servers and switches managed by a "cloud middleware", which is either open source (like OpenStack), commercial (VMware vCloud), or a tailored, vendor-specific solution. Depending on the cloud platform, which is used (OpenStack, VMware vCloud), the cloud application infrastructure management concept is different (like OpenStack Heat or VMware vApp) reflecting the specifics of the cloud platforms employed.

The orchestrator may use a cloud management system to reserve, manage and monitor virtual compute resources but also to derive interconnect parameters (like inner/out IP addresses). This cloud management system somewhat reflects the virtual infrastructure manager VIM in ETSI NFV MANO.

Furthermore, the orchestrator may utilize an application management system (VNF, virtual network function manager in ETSI NFV MANO) to deploy applications on virtual machines and to interconnect those. In some implementations the orchestrator will do resource reservation, in other implementations the application manager will do this on behalf of the orchestrator.

With such a setup, applications can be dynamically invoked/shut down and monitored on demand. These applications can communicate with each other and can also address nodes outside the data center, e.g., by using IP addresses.

A first beneficial extension to such a system would be to also make transport resources accessible as virtual resources that can be taken into account when implementing a network service.

FIG. 4 illustrates a setup where also transport resources can be managed. In this setup, virtualized transport resources (represented by SDN data forwarding network elements NEs at the bottom) are made accessible to a Transport Access Manager TAM control entity whose main component is a transport SDN controller (middle-right in FIG. 4).

This TAM entity would allow an orchestrator to use high level abstract commands to establish connectivity with entities outside the data center whereas the transport resources that are used might be shared with 3$^{rd}$ party operators/transport network providers. For example, if a transport network were built on layer 2 SDN switches, those resources which are accessible for a certain operator form a pool of transport resources this operator can utilize.

Figure 5:
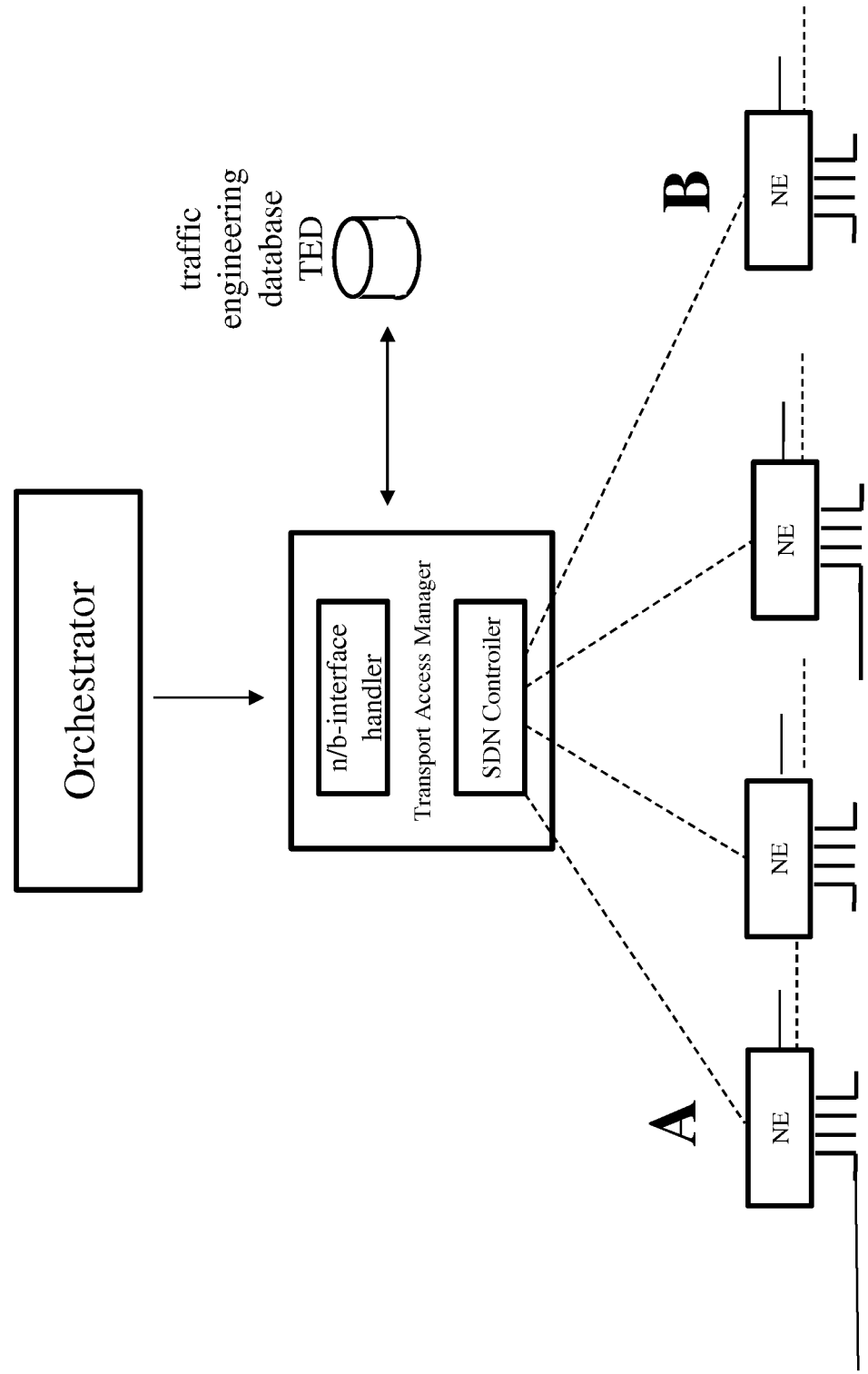
FIG. 5 illustrates principles of a transport access manager according to certain example embodiments of the invention.

FIG. 5 illustrates the principles of a TAM. An orchestrator may issue an abstract command (e.g., "provide 10 GBit/s connectivity between topological point A and topological point B"). This abstract command will be analyzed in a northbound interface handler and may result in querying a traffic engineering data base TED, e.g., by employing path computation elements PCEs. As a result of this, the TAM will have the knowledge which NEs will be affected as part of a connection between A and B. Subsequently, the SDN controller will be instructed to install a 10 GBit/s connection between A and B using an SDN control protocol (such as OpenFlow or ForCES).

In the example of FIG. 4, an application that is running in a data center shall communicate with a host which is also connected to the SDN-based virtual transport network. A typical example could be an eNodeB (physical hardware) communicating to an MME instance running in a data center cloud.

So when implementing a network service, an orchestrator can use a cloud management system to reserve (and cloud-interconnect) compute resources, an application management system to invoke applications and a TAM/SDN controller to connect in-cloud applications with outside-of-cloud hosts by flexibly assigning appropriate transport resources.

Another beneficial extension of this system would be to allow applications to also steer virtual transport resources. A typical example for such a use case are gateways, fixed gateways like the broadband remote access server BRAS as well as mobile gateways like the serving gateway S-Gw and packet data gateway P-Gw. Those nodes have the communality that the user data U-Plane is closely integrated with a signalling plane C-plane. Therefore, in case these are run as applications in a data center all the user data (e.g. HD video) also has to be directed into the data centre, which may consume a lot of resources just to handle the U-Plane. However, the close interworking between signalling and data plane does not allow to only run the U-plane in standard data forwarding nodes (such as routers and switches), having the control plane run in a data center (which would be the most preferable solution) since, for example, GTP tunnel handling (for mobile gateways) is not available in switches or routers. However, an application (such as a S-Gw control plane) might use an SDN controller to instruct the data forwarding plane of an SDN NE to manipulate packet headers on a per-packet basis by configuring flow tables accordingly. With such a setup a U/C-plane separation with the C-plane running in a data centre and the U-Plane handled in the transport layer is possible.

However, if applications are used to steer/configure the use of transport resources (e.g., in case of gateway de-composition as described above) there are several entities in a network that have control access to the same resources, which will lead to inconsistencies.

Figure 6:
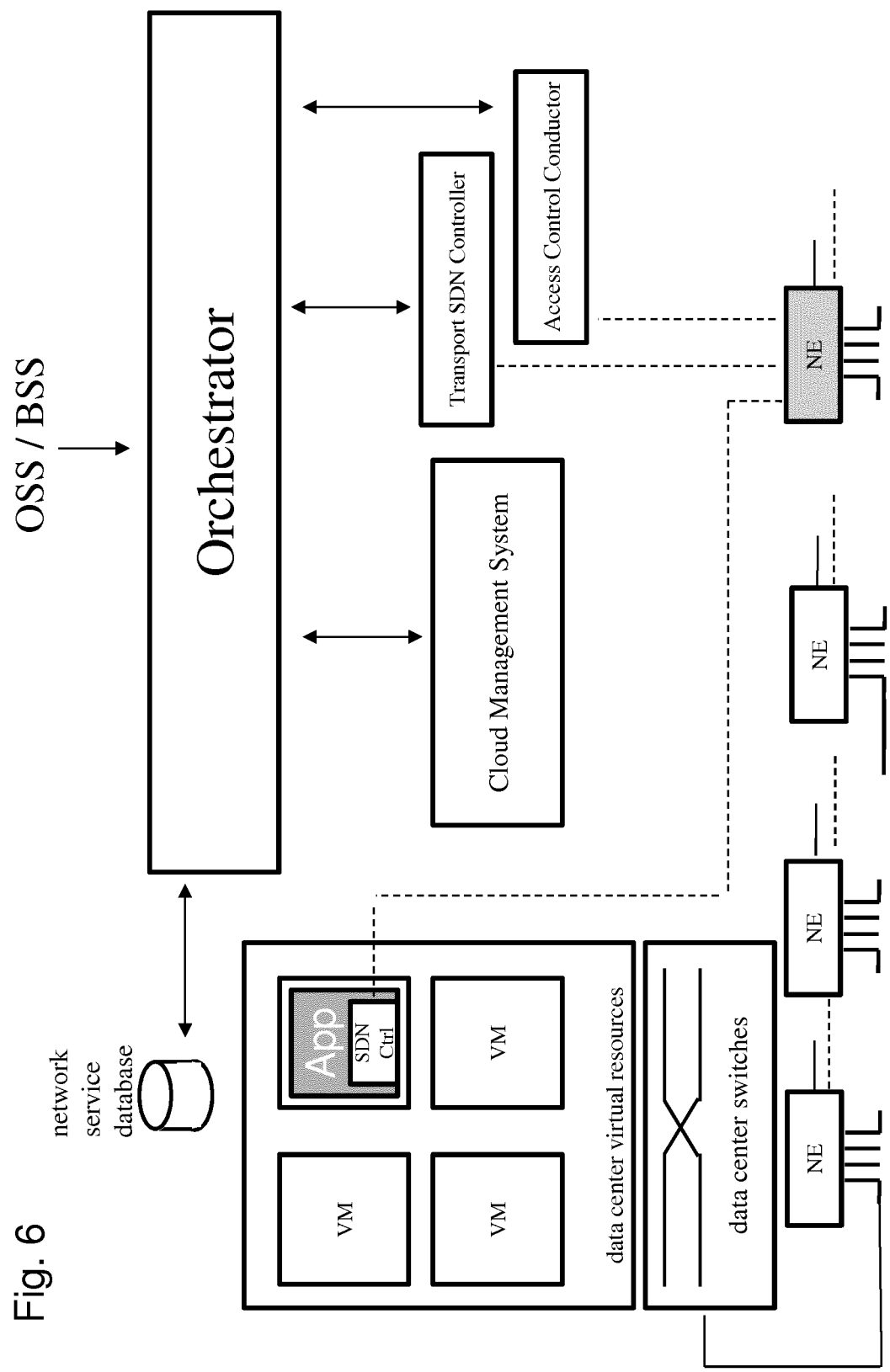
FIG. 6 illustrates a setup for controlling virtualized resources according to certain example embodiments of the invention.

In FIG. 6 there is a setup where an application "App" with an built-in SDN controller is steering an SDN data forwarding element NE (both colored grey). In addition, there is a Transport SDN Controller which is used to control NEs (also the grey one) to interconnect applications in the cloud with hosts outside the cloud (as shown in FIG. 4). In this case, both SDN controllers might have the need to configure resource usage at the (grey) SDN NE. In order to avoid conflicts (e.g. double usage of resources), there shall be an additional function "Access Control Conductor" which will manage the accessibility of control access of various (SDN) control entities to the same NEs.

Figure 7:
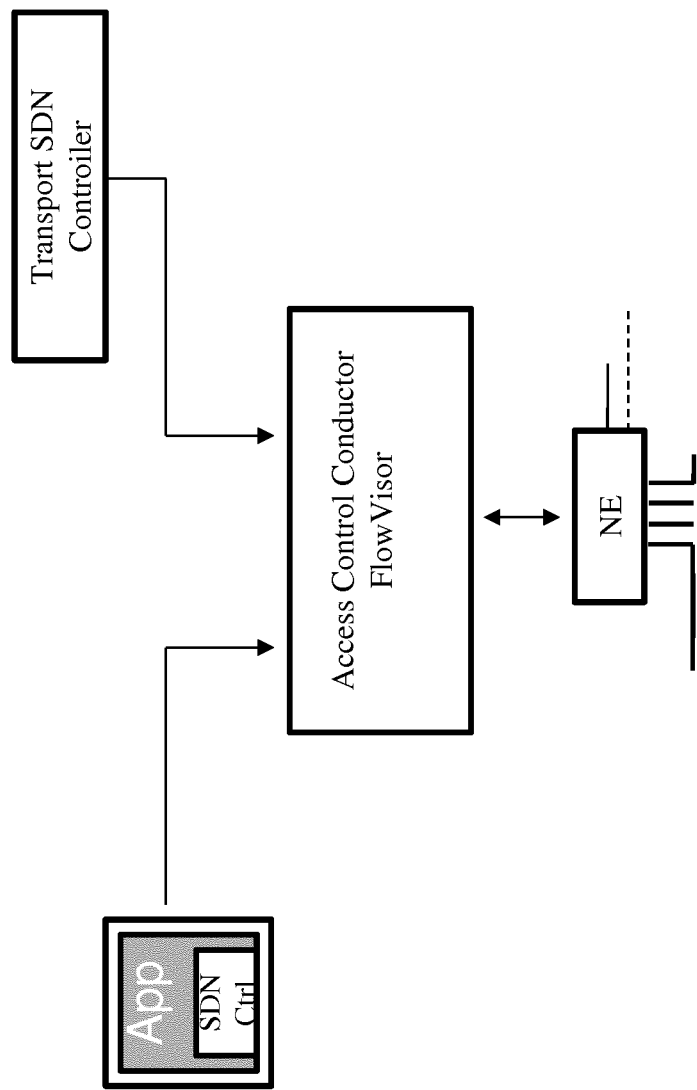
FIG. 7 shows an implementation example of resource control access steering according to certain example embodiments of the invention.
Figure 8:
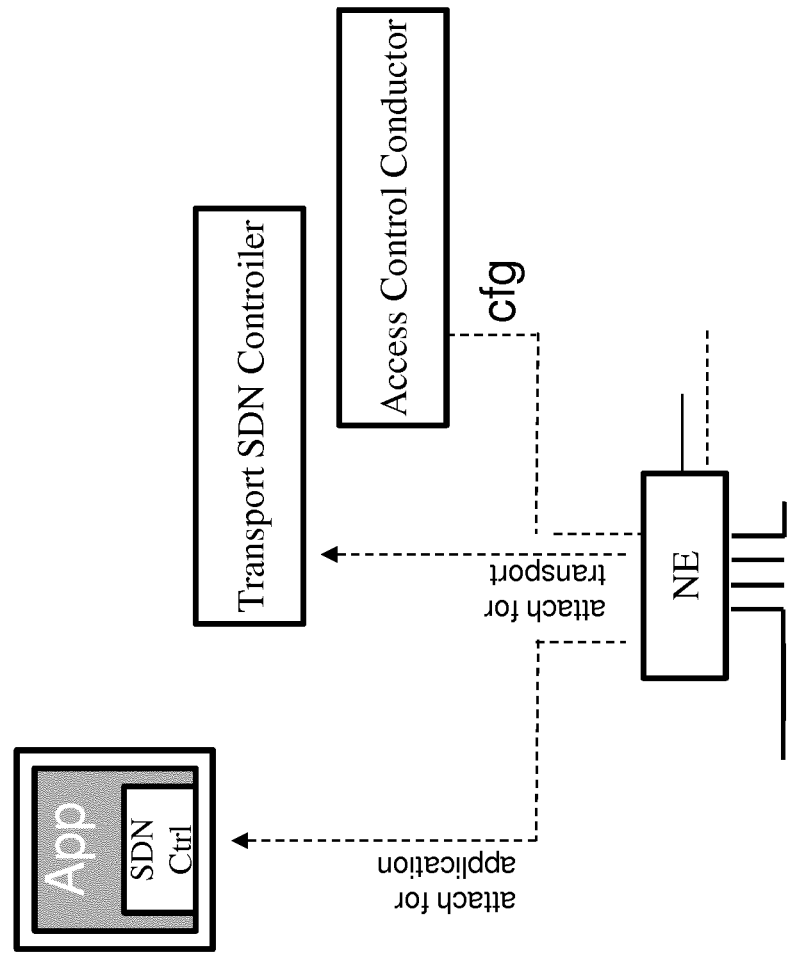
FIG. 8 shows an implementation example of resource control access steering according to certain example embodiments of the invention.

FIGS. 7 and 8 show two different implementation examples of such a resource control access steering. In FIG. 7 an application and a Transport SDN controller will access the same NE to configure resource usage. Here the Access Control Conductor ACC is realized as a controller proxy, which will make only those resources visible to the steering component (SDN controller) that it considers appropriate. For example, if the NE will have 8 physical ports (denoted as port 0.7), the ACC can act as a controller proxy that will only allow modifications of port 0.3 for the App-SDN-Ctrl and port 4.7 for the Transport SDN controller. This way, the NE appears as a 4-port switch to both controllers. In some implementations it could be beneficial to co-locate the ACC and the NE, in other implementations the ACC is part of a transport access manager TAM (see FIGS. 4 and 5).

FIG. 8 shows an implementation where the ACCconfigures the NE. In case there are two controller instances that need to configure the resource handling at the NE, the ACC might instantiate two virtual switches at the NE, e.g., by providing access to two different flow tables (one is conducted by App-SDN Ctrl, the other by TRA-SDN-Ctrl). Each flow table will only allow to steer resources on port 0-3 or port 9. FIG. 8 also shows optional "attach" mechanisms. Those can be used in scenarios where the SDN controllers are informed about the available resources by the NEs actively attaching to them. Possible options for configuration protocols are, e.g., OF Config or Simple Network Management Protocol SNMP.

Figure 9:
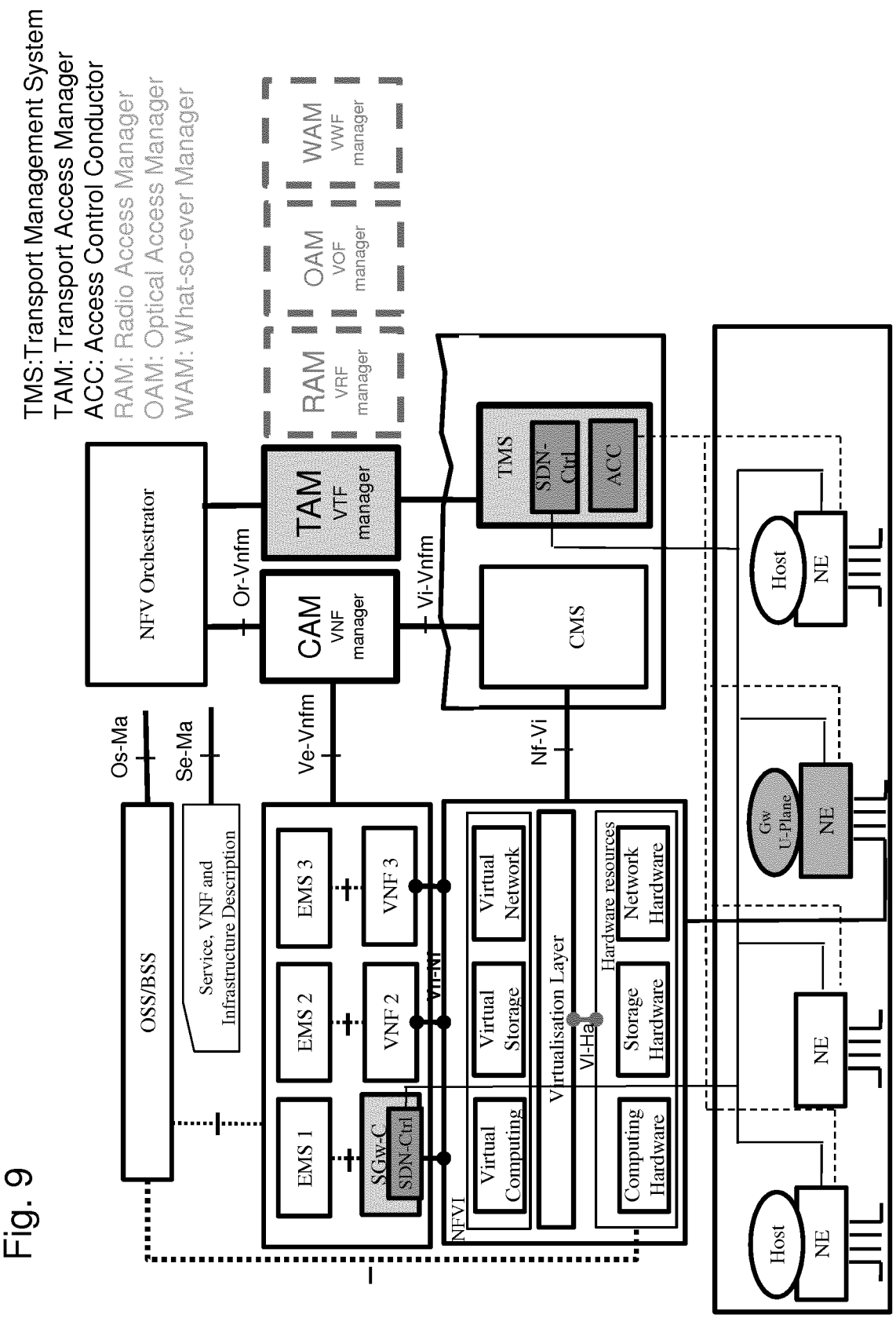
FIG. 9 schematically shows the mapping of certain example embodiments according to the invention to the ETSI network functions virtualization architecture of FIG. 2.

FIG. 9 shows the mapping of the above principles to the ETSI NFV architecture according to some example embodiments of the invention.

The NFV Orchestrator will receive instructions from the OSS/BSS (or any other high level entity) to implement a network service. Those services include applications that are deployed via a VNF manager, denoted here as cloud application manager CAM. Those services also include interconnections between applications (inside and outside a data center) and physical nodes outside the data center (hosts). These applications use virtual resources that are provided by a cloud management system (CMS). If these applications are supposed to be connected with other applications outside a data center (hosts) by means of virtual transport resources, the orchestrator can instruct the TAM to manage this interconnect via a transport SDN controller. The TAM can thus be considered as a Virtual Transport Manager (VTF manager) located at the same functional level as a VNF manager. Furthermore, FIG. 9 shows an application SGw-C representing an S-Gw control plane application that is running as a virtual network function VNF. This application contains or has access to an SDN-Ctrl which handles the steering of SDN forwarding resources for GTP U-Plane handling in an SDN-NE. Since there are two entities in the system which have SDN-control access (SGw-C and transport SDN controller) to the same pool of physical transport resources (NEs), the TAM will instruct a transport management system TMS (logically on the same level as a cloud management system). This TMS includes the transport SDN controller and the ACC as described above. All entities that are new to the NFV architecture are shaded grey.

In this example the TMS is resided on the same administrative level as the CMS. While the CMS will configure virtual cloud resources, the TMS will configure virtual transport resources. Consequently, the TAM is considered to be on the same administrative level as the CAM. The CAM acts as a "virtual network function" manager, the TAM will act as a "virtual network transport" manager. Following this philosophy, future new types of virtual resources like radio access or optical resources might follow this principle.

Figure 10:
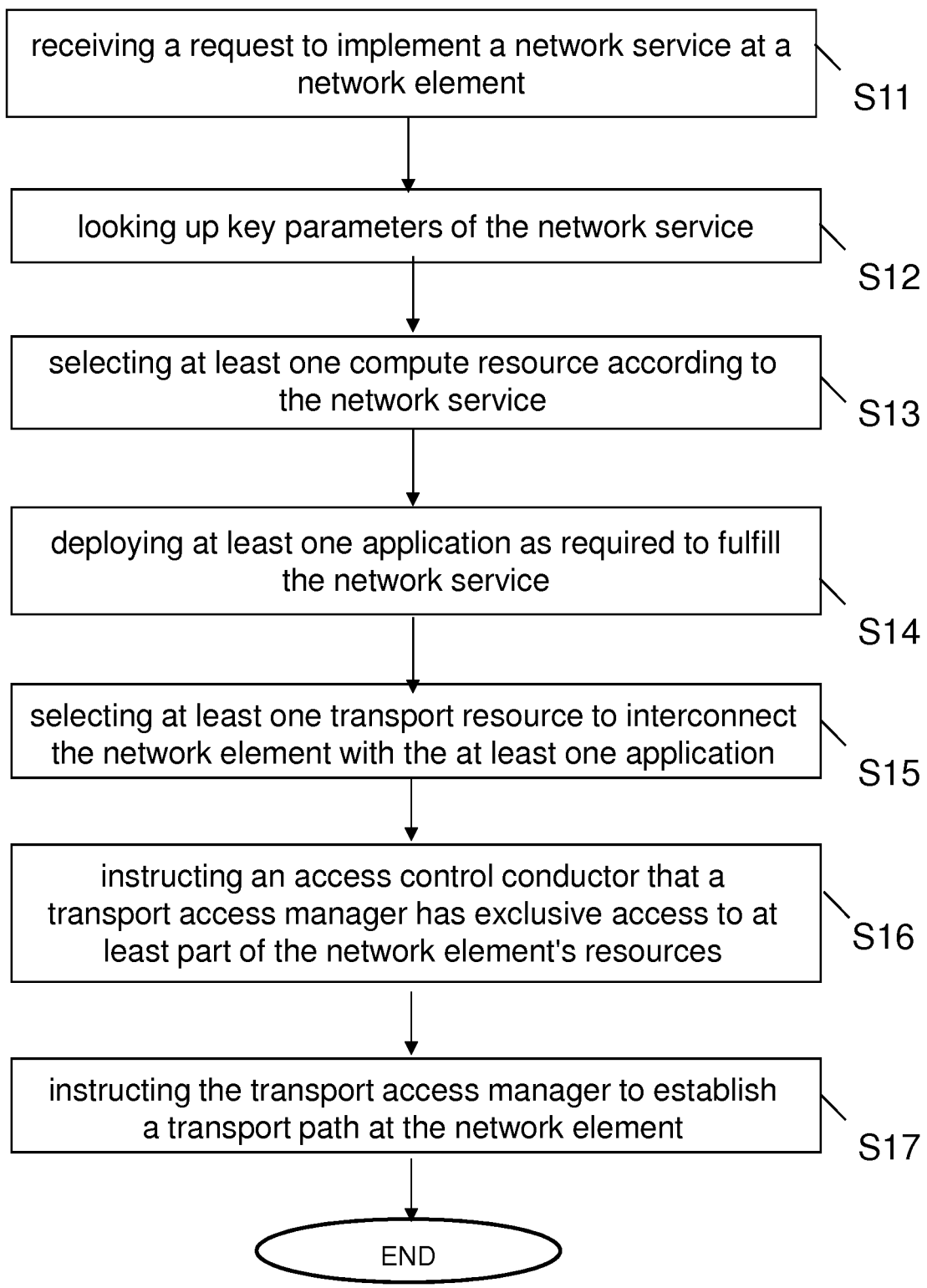
FIG. 10 schematically illustrates a method according to some example embodiments of the invention.

FIG. 10 shows a method according to some example embodiments of the disclosure, which may be performed, as a non-limiting example, by a network functions virtualization orchestrator as a processor implemented method.

At S11, a request to implement a network service at a network element is received.

Then, at S12, key parameters of the network service are looked up.

Further, at S13, at least one compute resource according to the network service is selected.

Still further, at S14, at least one application as required to fulfill the network service is deployed.

Moreover, at S15, at least one transport resource to interconnect the network element with the at least one application is selected.

Then, at S16, an access control conductor is instructed that a transport access manager has exclusive access to at least part of the network element's resources.

Finally, at S17, the transport access manager is instructed to establish a transport path at the network element.

Figure 11:
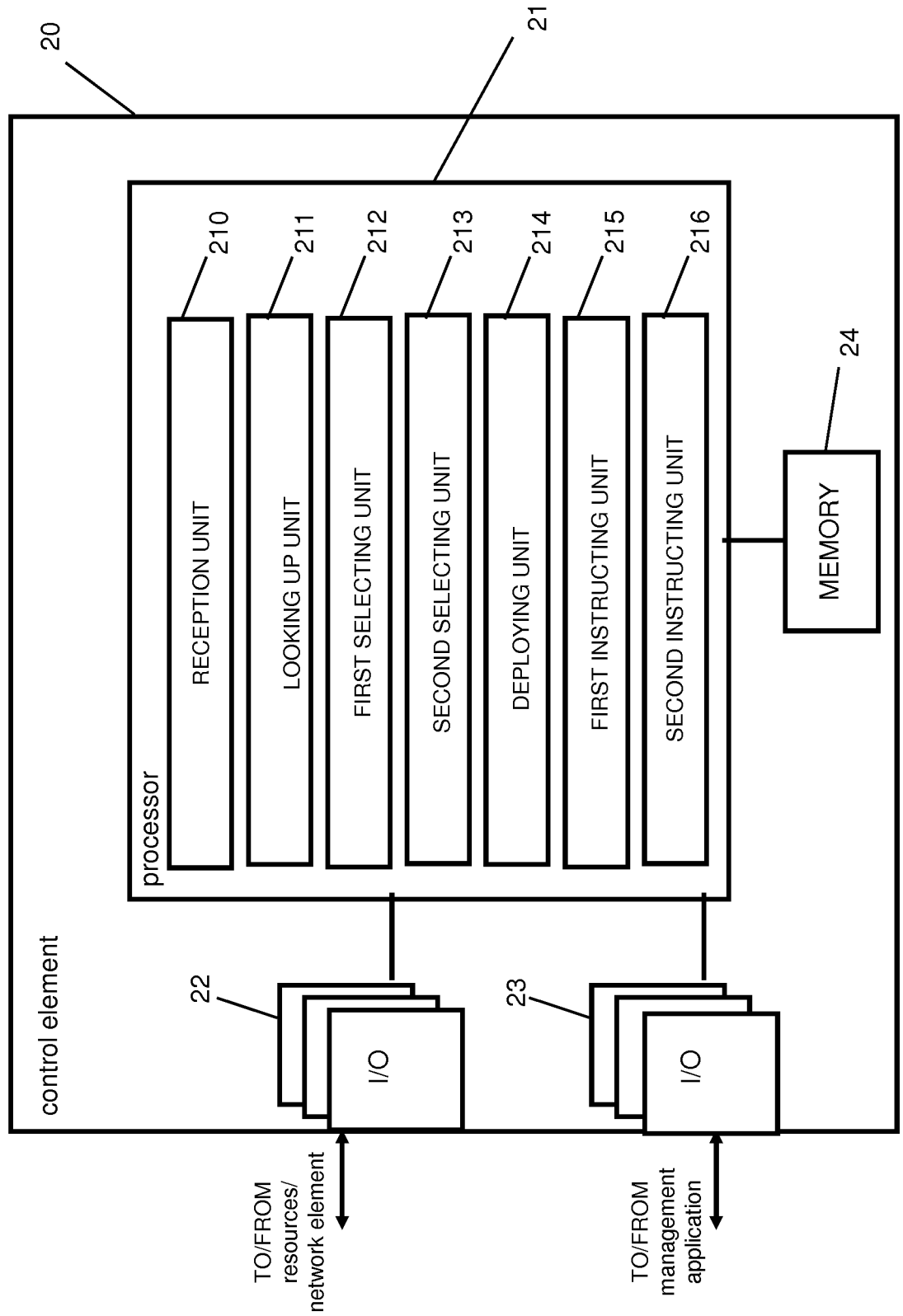
FIG. 11 schematically illustrates an apparatus according to some example embodiments of the invention.

In FIG. 11, a diagram illustrating a configuration of an element included in a control element according to some example embodiments of the disclosure is shown, which is configured to implement control of virtualized resources as described in connection with some of the example embodiments of the disclosure. The example embodiment may be carried out in or by a control element. It is to be noted that the control element may comprise elements or functions, such as a chipset, a chip, a module etc., which can also be part of a control element or attached as a separate element to a control element, a Virtual Machine, or the like. It should be understood that each block and any combination thereof may be implemented by various means or their combinations, such as hardware, software, firmware, one or more processors and/or circuitry.

The control element 20 shown in FIG. 11 may comprise a processing function, control unit or processor 21, such as a CPU or the like, which is suitable for executing instructions given by programs or the like related to the control element control procedure.

The processor 21 is configured to execute processing related to the above described control of virtualized resources. In particular, the processor 21 comprises a sub-portion 210 as a reception unit configured to receive a request to implement a network service at a network element. The portion 210 may be configured to perform processing according to S11 of FIG. 10. Furthermore, the processor 21 comprises a sub-portion 211 usable as a looking up unit configured to look up parameters of the network service. The portion 211 may be configured to perform processing according to S12 of FIG. 10. Furthermore, the processor 21 comprises a sub-portion 212 usable as a first selecting unit configured to select at least one compute resource according to the network service. The portion 212 may be configured to perform processing according to S13 of FIG. 10. Still further, the processor 21 comprises a sub-portion 213 usable as a second selecting unit configured to select at least one transport resource to interconnect network element. The portion 213 may be configured to perform processing according to S14 of FIG. 10. Moreover, the processor 21 comprises a sub-portion 214 usable as a deploying unit configured to deploying at least one application as required to fulfill the network service. The portion 214 may be configured to perform processing according to S15 of FIG. 10. Still further, the processor 21 comprises a sub-portion 215 usable as a first instruction unit configured to instruct an access control conductor that a transport access manager has exclusive access to at least part of the network element's resources. The portion 215 may be configured to perform processing according to S16 of FIG. 10. Moreover, the processor 21 comprises a sub-portion 216 usable as a second instructing unit configured to instruct the transport access manager to establish a transport path at the network element. The portion 216 may be configured to perform processing according to S17 of FIG. 10.

Reference signs 22 and 23 denote transceiver or input/output (I/O) units (interfaces) connected to the processor 21. The I/O units 22 may be used for communicating with e.g. resources and/or network elements. The I/O units 23 may be used for communicating with e.g. a management application. Reference sign 24 denotes a memory usable, for example, for storing data and programs to be executed by the processor 21 and/or as a working storage of the processor 21.

Figure 12:
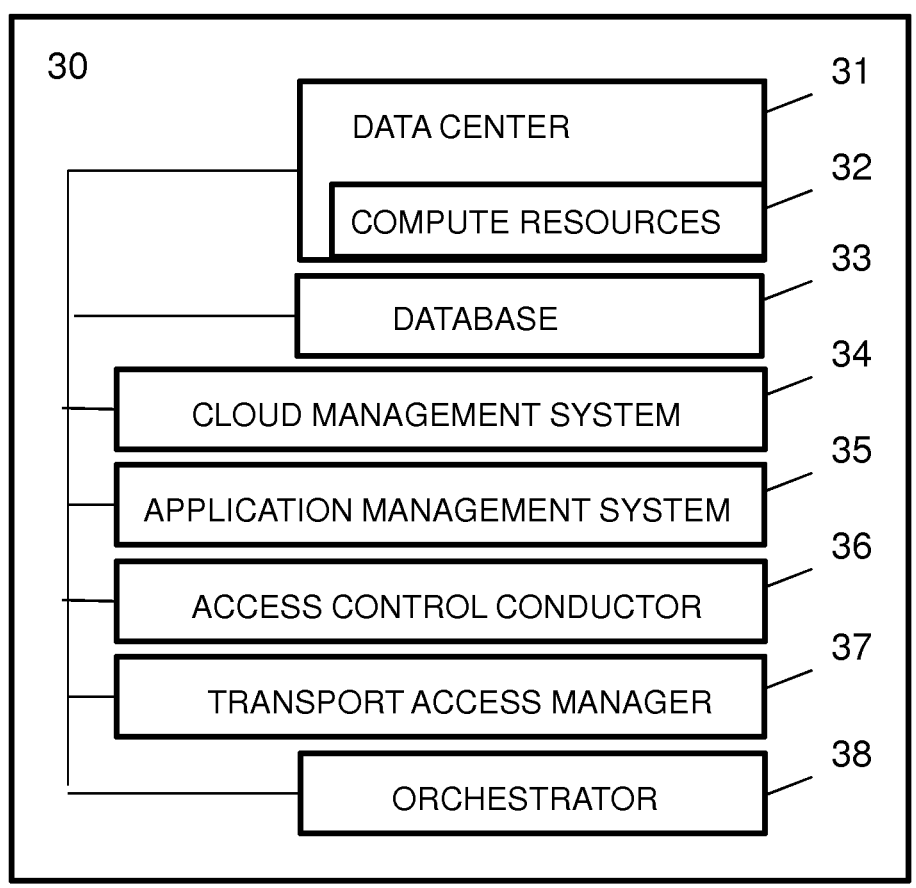
FIG. 12 illustrates a system according to some example embodiments of the invention.

FIG. 12 schematically illustrates a system for controlling virtualized resources according to some example embodiments of the invention.

The system 30 comprises a data center 31 comprising compute resources 32, a database 33 storing parameters of a network service, a cloud management system 34 configured to select at least one compute resources according to the network service, an application management system 35 configured to deploy at least one application, as required to fulfill the network service, an access control conductor 36 configured to control access to a network element affected by the network service, a transport access manager 37 configured establish a transport path at the network element, and an orchestrator 38 configured to control, based on a request to implement the network service, the cloud management system 34, the application management system 35, the access control conductor 36 and the transport access manager 37.

Figure 13:
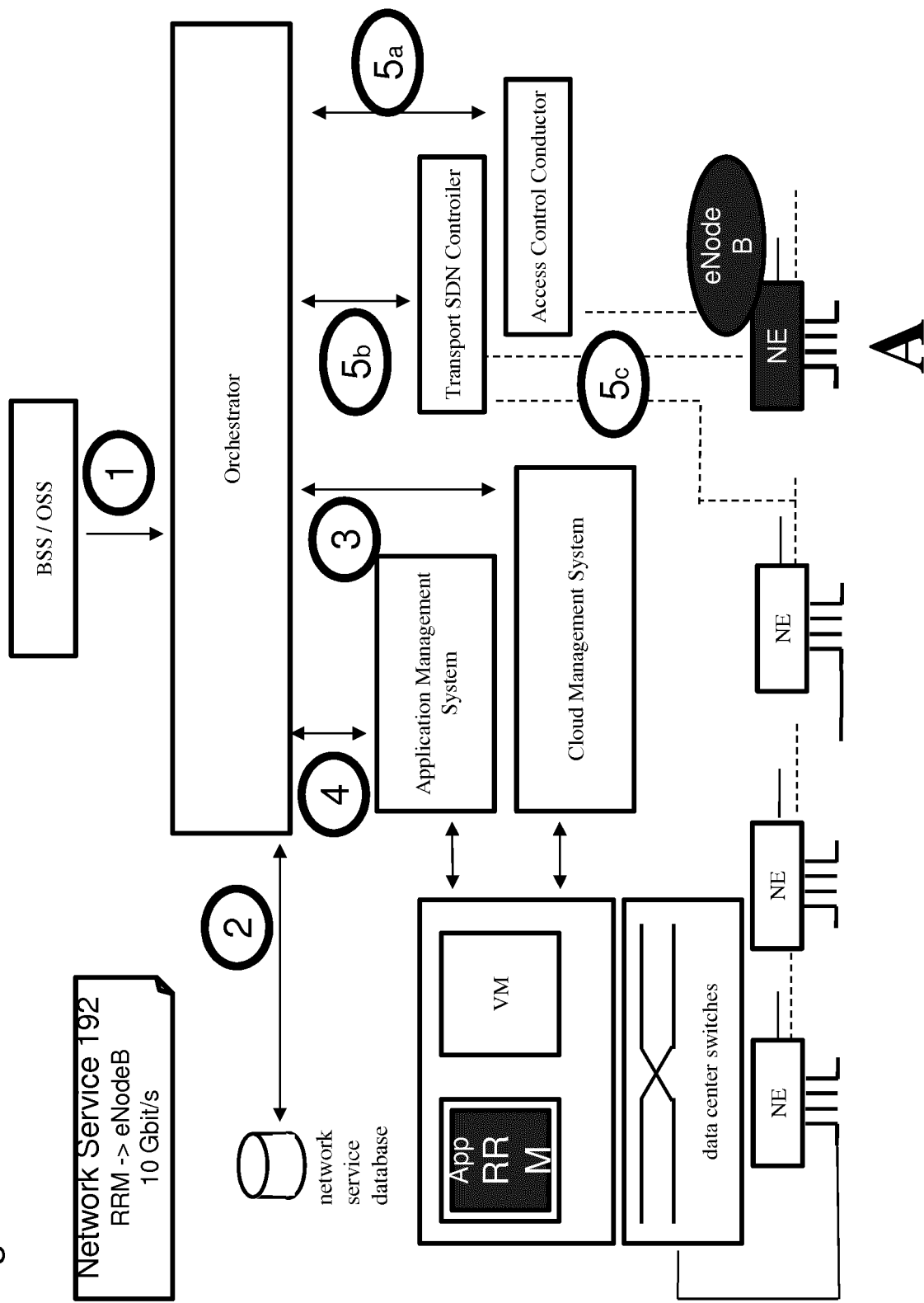
FIG. 13 shows an implementation example according to certain example embodiments of the invention.

FIG. 13 shows an implementation example for the principles described above. It shows a system where a catalogue of network service descriptors is stored in a network service database. As an example, network service 192 is shown which includes radio resource management for one or several eNodeBs with an interconnection between them at 10 Gbit/s.

At 1, the OSS/BSS submits the request for implementing this network service for a topological point A (specifying the location or network embedding of this eNodeB). At 2, the orchestrator will look up the key parameters of this network service and take actions accordingly: At 3, the orchestrator will select suitable compute resources (VM) via the cloud management system and at 4, it will instruct the Application Management System to deploy as many Radio Resource Management RRM applications as required to fulfil the network service (one RRM app in the example)

Since the eNodeB resides outside the data center, the interconnection between the RRM app and the eNodeB requires the use of SDN transport resources. The configuration of these happens at 5a, where the orchestrator instructs the access control conductor that the SDN transport controller has exclusive access to the NE to which the eNodeB is connected to. Furthermore, it instructs the transport SDN controller to establish appropriate transport paths by modifying the flow tables of the affected NEs.

Figure 14:
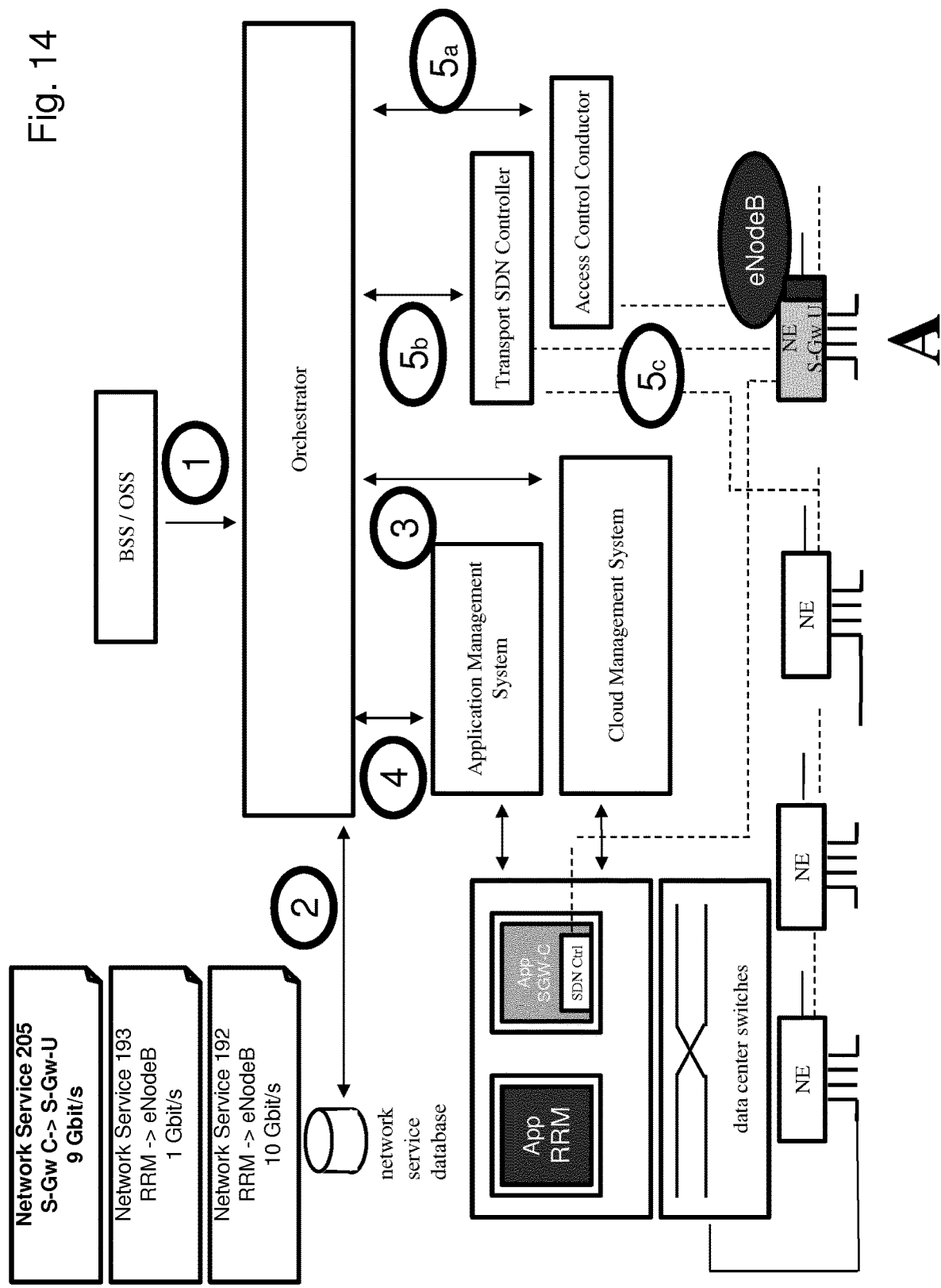
FIG. 14 shows an implementation example according to further certain example embodiments of the invention.

This part of the example only shows the usage of a pure transport SDN controller. FIG. 14 shows an extension of this implementation example with more than one SDN steering entity.

Here, two examples of additional network services are shown: service 193, which is similar to 192 but with only a tenth of the bandwidth and a service 205, which describes the setup of a de-composed mobile gateway (S-Gw), comprising of a S-Gw-C part (running as application(s) in a data center) and an S-Gw-U part (running on one or several NEs in the transport). The gateway C-part will steer the NE's forwarding plane (e.g., to perform GTP tunnel handling) using SDN control mechanisms (e.g., the OpenFlow protocol).

In the example, a system as described in 13 is running, i.e., a network service 192 has been implemented. Now, at 1, the OSS/BSS instructs the orchestrator to transform service 192 into service 193 (i.e., the service shall be reduced to 10% of its original capacity) and additionally implement service 205 (setting up of a de-composed virtualised S-Gw). At 2, the orchestrator looks up these services in the network service database. At 3 and 4, it instructs the CMS and AMS to reserve suitable compute resources and to deploy an SGw-C application with an embedded SDN controller. Furthermore, ats 5a,b,c the ACC is instructed to limit the control access of the transport SDN controller to a tenth of the original resources for the NE at topological point A (e.g., to allow only manipulations for port 0 in a 10 port switch) while it assigns control access to the App SGW-C for 90% of the resources (e.g., control access to ports 1 to 9 in a ten port switch).

The invention is useful as follows:
It allows automated control of the utilization of virtual transport resources in a similar manner as is in place for steering virtual compute resources
It allows to build applications that steer transport resources
Allows to use said transport resources for intra-, inter- and cloud-to non-cloud connectivity
Allows that several functions utilize the same network transport resources independently
Allows flexible assignment of functions to resources, e.g. control plane is handled in the data center, data plane is handled in the transport network
Without the described principles it will not be possible to:
De-compose network nodes in such a way that the data plane resides in the transport network.
Consequently, all user payload data will have to be conveyed to the data center It is to be noted that example embodiments of the invention may be implemented as circuitry, in software, hardware, application logic or a combination of software, hardware and application logic. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer or smart phone, or user equipment.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

The invention relates in particular but without limitation to virtualization in mobile communications, for example to environments under GSM, 3G, LTE™ or LTE-Advanced, and can advantageously be implemented also in controllers, base stations, user equipments or smart phones, or computers connectable to such networks. That is, it can be implemented e.g. as/in chipsets to connected devices.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following meanings for the abbreviations used in this specification apply:
ACC Access Control Conductor
BSS business support system
CAM cloud application manager
eNodeB evolved Node B (base station in LTE environment)
ETSI European Telecommunications Standards Institute
GTP GPRS tunnel protocol
NE Network element
NF network function
NFV Network Functions Virtualization
OSS operations support system
PCE path computation elements
P-Gw paket data gateway
RRM Radio Resource Management
SDN software defined networking
S-Gw serving gateway
TAM Transport Application Manager
TMS transport management system
VIM virtualised infrastructure manager
VM virtual machine (compute resource)
VNF Virtual Network Function
VNFM VNF Manger

What is claimed is:

1. A processor implemented method for controlling virtualized resources, comprising:
receiving a request to implement a network service at a network element;
looking up key parameters of the network service;
selecting at least one compute resource according to the network service;
deploying at least one application as required to fulfill the network service;
selecting at least one transport resource to interconnect the network element with the at least one application;
instructing an access control conductor that a transport access manager has exclusive access to at least part of the network element's resources; and
instructing the transport access manager to establish a transport path at the network element.

2. The method according to claim 1, wherein the network functions virtualization orchestrator is a network orchestration part of a software defined networking system.

3. The method according to claim 1, wherein the access control conductor is configured to manage the competitive access of applications or controllers to transport resources of the same network elements.

4. The method according to claim 1, wherein the compute resources are virtual machines.

5. The method according to claim 1, wherein the transport access manager comprises a software defined networking transport controller.

6. The method according to claim 5, wherein the transport access manager further comprising an access control conductor configured to manage accessibility of control access to respective network elements.

7. The method according to claim 1, wherein the request is received from a high level entity, such as operations support system and a business support system.

8. An apparatus for controlling virtualized resources, comprising:
at least one processor, and
at least one memory for storing instructions to be executed by the processor,
wherein
the at least one memory and the instructions are configured to, with the at least one processor, cause the apparatus at least to perform receiving a request to implement a network service at a network element;
looking up parameters of the network service;
selecting at least one compute resource according to the network service;
deploying at least one application as required to fulfill the network service;
selecting at least one transport resource to interconnect the network element with the at least one application;
instructing an access control conductor that a transport access manager has exclusive access to at least part of the network element's resources; and
instructing the transport access manager to establish a transport path at the network element.

9. The apparatus according to claim 8, wherein the network functions virtualization orchestrator is a network orchestration part of a software defined networking system.

10. The apparatus according to claim 8, wherein the access control conductor is configured to manage the competitive access of applications or controllers to transport resources of the same network elements.

11. The apparatus according to claim 8, wherein the compute resources are virtual machines.

12. The apparatus according to claim 8, wherein the transport access manager comprises a software defined networking transport controller.

13. The apparatus according to claim 12, wherein the transport access manager further comprising an access control conductor configured to manage accessibility of control access to respective network elements.

14. The apparatus according to claim 8, wherein the request is received from a high level entity, such as operations support system and a business support system.

15. A computer program product embodied on a non-transitory computer-readable medium, said product comprising software code portions for performing the steps of claim 1 when the product is run on the computer.

\* \* \* \* \*